March 23, 1965 G. H. STRITE 3,174,651
APPARATUS FOR PREPARING ANIMAL FEEDS
Filed July 2, 1962 3 Sheets-Sheet 1

INVENTOR.
GORDON H. STRITE
BY
*Francis J. Klempay*
ATTORNEY

March 23, 1965    G. H. STRITE    3,174,651
APPARATUS FOR PREPARING ANIMAL FEEDS
Filed July 2, 1962    3 Sheets-Sheet 2

INVENTOR.
GORDON H. STRITE
BY
*Francis J. Klempay*
ATTORNEY

March 23, 1965  G. H. STRITE  3,174,651

APPARATUS FOR PREPARING ANIMAL FEEDS

Filed July 2, 1962  3 Sheets-Sheet 3

INVENTOR.
GORDON H. STRITE
BY
Francis J. Klempay
ATTORNEY

United States Patent Office

3,174,651
Patented Mar. 23, 1965

3,174,651
APPARATUS FOR PREPARING ANIMAL FEEDS
Gordon H. Strite, 805 Primrose Drive, Belleville, Ill.
Filed July 2, 1962, Ser. No. 206,835
7 Claims. (Cl. 222—132)

This invention relates to the general art of animal husbandry, and more particularly to an improved and simplified apparatus for preparing composite feeds for animals, particularly those of dairy herds. In accordance with scientific discoveries and advances in the administration of dairy herds, it has been demonstrated that profitable management is related to a sensitive balance between the proportionate quantities of nutrients given the herd and derived, on the one hand from green forage and on the other from a supplemental composite diet of grain and similar feeds. Further, the composition and the condition of the components in the supplemental diet has been found to be very important for maximum milk production at the lowest possible cost because of the varying characteristics of different herds, conditions of shelter and analysis of water supply, and analysis of the nutrient content and trace elements in the forage.

Components of the supplemental feeds commonly given to a dairy herd may include oats, soy beans, shelled corn, and specially prepared supplements as well as other grains and similar granulous edibles. As stated above, it is desirable that these be combined in precise proportion to satisfy the total digestible nutrient requirements of the animals, and it is accordingly the primary object of this invention to provide an improved and simplified apparatus which is capable of receiving the selected solid granulous edibles from their respective bins and combining and mixing the same in a conveyor which is operative to convey the mixed composite feed throughout a feeding barn, for example, and into the individual feed boxes provided for the animals. Thus, the apparatus of this invention is well suited for use with a distributive and automatically controlled conveyor system, not included herein, to supply feed to the feed boxes of the apparatus for feeding and watering animals disclosed in my co-pending application Serial No. 158,005, filed December 8, 1961.

A further object of the invention is the provision of improved and simplified apparatus of the kind generally outlined above which is operative to crush a selected one or a few of the grains or other granulous edibles before the same are mixed into the composite feed. In the case of shelled corn particularly, the pre-crushing of the material not only aids in the intermixing and retention of dispersion of the ingredients but also increases the ready availability of this high energy food in the digestive tracts of the animals.

The above and other objects and advantages of the invention will become apparent upon consideration of the following specification and the accompanying drawing wherein there is disclosed a preferred embodiment of the invention.

Figure 1:
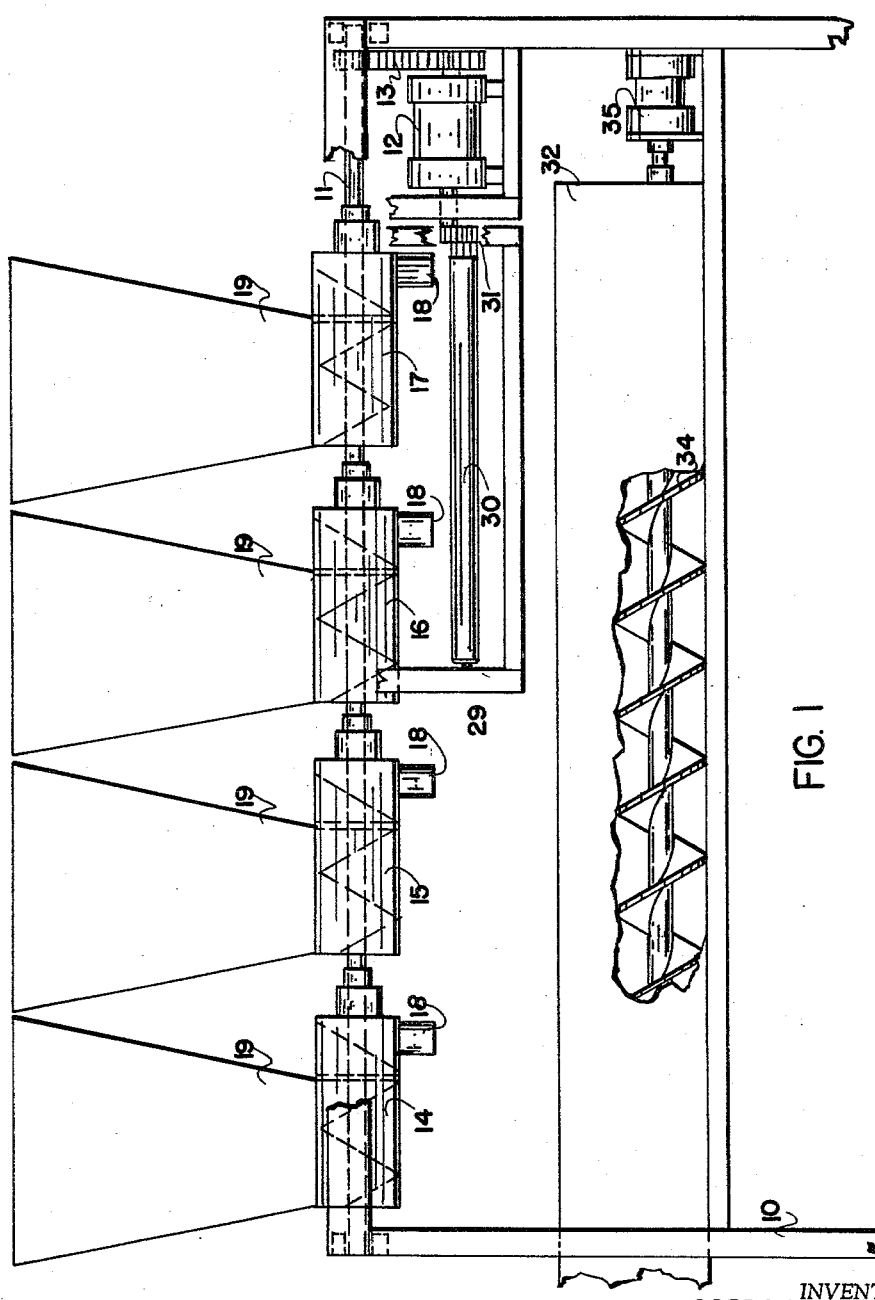
FIGURE 1 is a side elevation, with a few parts broken away, of a composite feed preparing apparatus constructed in accordance with the principles of the invention.
Figure 2:
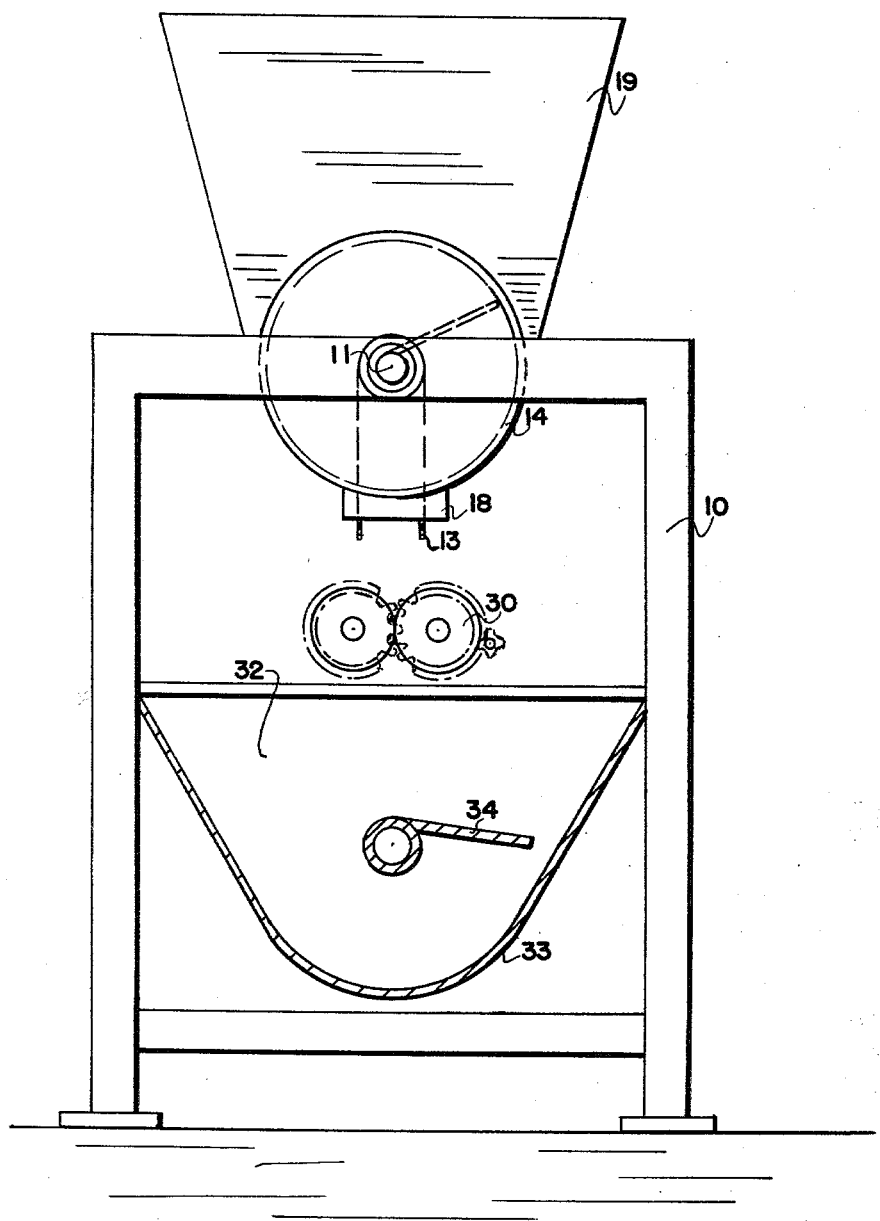
FIGURE 2 is an end elevation of the apparatus of FIGURE 1.

The apparatus of the invention, in its illustrated embodiment, is assembled on a suitable base 10 in which is journalled, in its upper portion, a continuous shaft 11 arranged to be driven by a motor and speed reducer 12 through a chain or belt 13. Also mounted on the base 10 and concentric about the shaft 11 is a plurality of longitudinally aligned tubes 14–17 each having a discharge outlet 18. A portion of each of the tubes 14–17 is open at the top and thus is in communication with the space within a hopper 19, one of which is provided for each of the tubes 14–17. It should be understood that the hoppers 19 will be connected as the outlets for large storage bins, not shown, for the grains, soy beans, etc., to be used for the composite feeds.

To simplify the apparatus the motorized gear reducer 12 is not adjustable as to output speed but, rather, is selected as having a speed sufficient to satisfy the maximum output requirements of any of the tubes 14–17. The rate of output of each of these tubes and consequently the precise proportioning of the feed components is accomplished by the apparatus now to be described.

Figure 3:
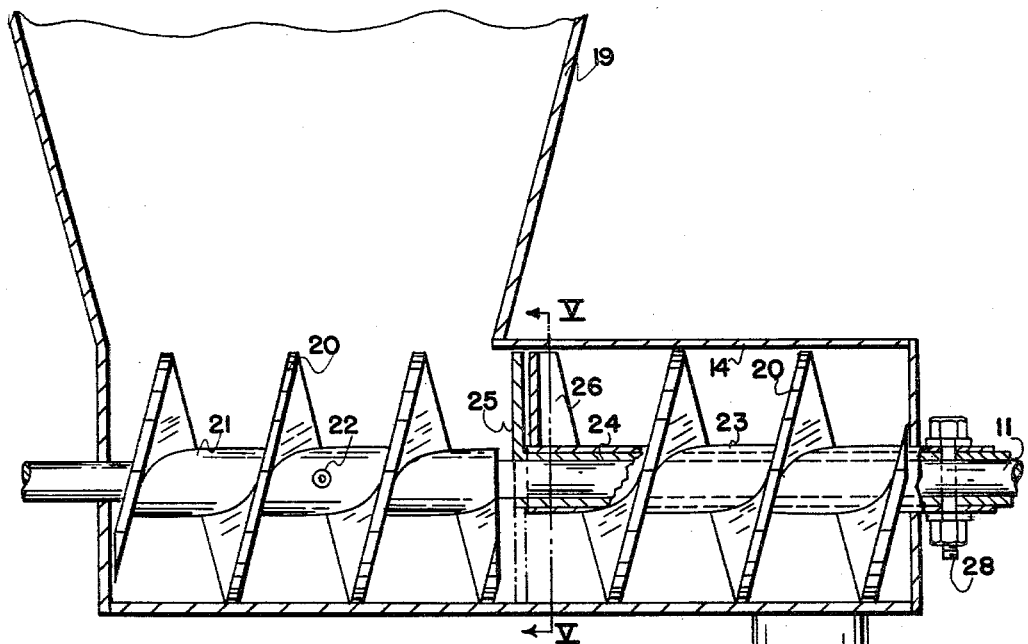
FIGURE 3 is a fragmentary sectional view through the apparatus used in the assembly to control the rate of outflow of the feed components from the respective bins.
Figure 4:
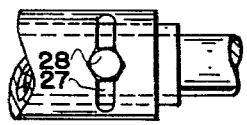
FIGURES 4 and 5 are detailed views of parts utilized in FIGURE 3, FIGURE 5 being taken along the line V—V of FIGURE 3.
Figure 5:
Figure 5:
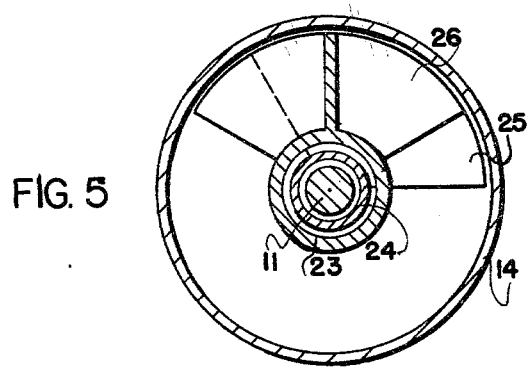

Referring now to FIGURE 3, it will be observed that an auger type of conveyor is closely received in each of the tubes 14–17, and in actual practice these augers, having flights designated generally by reference numeral 20, are welded onto tubes which slideably fit over the shaft 11. In the particular embodiment illustrated, the auger 20 within each of the tubes 14–17 is split into two sections—one section being welded onto tube 21 which is pinned onto the shaft 11 as at 22 and the other section of which is received within the protruding section of the tubes 14–17 and being mounted on sleeves 23. The internal diameters of the sleeves 23 are larger than the internal diameters of the tubes 21 to permit the presence of tubes 24 mounted concentrically on the shaft 11 and within the sleeves 23.

Welded or otherwise suitably secured onto the inner end of each of the tubes 24 is a disc segment 25 which has a circumferential dimension substantially equal to one third total internal circumference of the tubes 14–17. The inner end of the auger flight which is mounted on each of the sleeves 23 carries a second disc segment 26 which is generally parallel with the segment 25 and which also has a circumferential dimension substantially equal to one third total internal circumferential dimension of the tubes 14–17.

The tubes 24 and sleeves 23 extend outwardly of the closed ends of the tubes 14 in concentric relation as shown in FIGURE 3. Each of these members 23 and 24 have in their exposed portions circumferential slots 27 adapted to receive a bolt 28 which passes through a diametrical aperture formed in the main shaft 11. It should be obvious that upon loosening of the bolt 28 the sleeve 23 may be rotated relative to the tube 24 or vice versa, and in this manner the disc segments 25, 26 may be brought into concidence or alignment or be moved 180 degrees apart or be relatively located in any spaced position therebetween. In this manner the openings through the tubes 14–17 may be individually adjusted anywhere between one third and two thirds of the total cross-sectional area of the tubes. When it is desired to feed a smaller amount of material from any one bin and hopper the parts are, of course, adjusted to close off more of the opening through the tube 14–17 associated with this particular bin and hopper. It should also be obvious that, if it is desired to provide for the full closure of any one outlet the addition of a second concentric tube (like 24) and a third disc segment mounted thereon would enable this to be done since then the opening could be adjusted from fully closed position to two thirds full open position.

Journaled in suitable supports 29 mounted on the base 10 is a pair of crushing rolls adapted to be driven through gears 31 from the speed reducer 12. The rolls 30 are so positioned as to receive the materials coming from the tubes 16 and 17 through their outlets 18. Normally, the rolls 30 are continuously driven along with the main shaft 11 so that all the materials being fed by tubes 16 and 17 will be fed between the rolls and crushed. It should be obvious, however, that the illustrated rolls 30 may be replaced with rolls having working surfaces positioned below only one of the outlets 18, or, alternatively, suitable diverting baffles, not shown, may be employed to divert the materials around the rolls 30.

The longitudinally aligned outlets 18 and the crushing rolls 30 discharge by gravity down into a trough 32 which has a semi-cylindrical bottom surface 33 and an auger type of conveyor 34 lying in this semi-cylindrical bottom surface. Conveyor 34 is arranged to be driven by a motorized speed reducer 35 or other suitable drive, and it should be understood that the illustrated portion of the conveyor may be the head end of a complete system used to automatically distribute and supply the composite feed to the various feed boxes and other feeding stations throughout a farm establishment.

Due to wear of the flights of the auger 34 and the normal loose tolerances existent between the auger and its cooperating trough or tube the materials coming from the tubes 14–17 will be rapidly and thoroughly intermixed during a short passage along the conveyor trough 32. In a practical installation of the apparatus of the invention the motorized reducers 12 and 35 will be coupled together for simultaneous operation under suitable time control and with adequate safety switches, not shown, to shut down the line in the event of malfunctioning of any of the distributive conveyor system above mentioned. It should now be apparent that I have provided improved and simplified proportioning and intermixing apparatus for preparing composite animal feeds which accomplishes the objects initially set out. The mechanical arrangement for controlling the rate of outflow from each of the component bins is simple in design, reliable in operation, and capable of sustained periods of service without attention or maintenance. A meritorious feature of the invention is the use of the single shaft 11 which in actual practice, may be made rather rugged in size and support and which, since it rotates at uniform speed, may be driven by a simple inexpensive motorized gear reducer 12 which does not have the requirement of any complicated speed changing means. Another meritorious feature of the invention is the compactness of the assembly whereby the same may be readily installed and/or interchanged in a farm plant. Further economies and simplicity are attained by utilizing the screw conveyor 34 both as a conveyor and as an intermixing means for the component ingredients of the composite feed.

The above illustrated embodiment of the invention should be considered as illustrative only as obviously many changes may be made therein without departing from the spirit or scope of the invention. Some of the possible deviations are mentioned specifically above and others will readily suggest themselves to persons skilled in the art. Reference should therefore be had to the appended claims in determining the scope of the invention.

I claim:

1. In apparatus for preparing composite feed for animals comprising a frame, a longitudinally extending and elongated shaft journalled in the upper portion of said frame, a plurality of longitudinally aligned and longitudinally spaced tubes positioned concentrically about said shaft and having openings in the upper portions of their side walls, downwardly disposed feed hoppers communicating with said openings and said tubes projecting longitudinally outward from at least one longitudinal end of said hoppers, first screw conveyors keyed to said shaft below said openings and housed within portions of said tubes, other screw conveyors keyed to said shaft and positioned in the longitudinal projecting portions of said tubes, means in each tube between said first and other screw conveyor to adjust the opening therebetween, power means mounted on said frame to rotate said shaft, and discharge outlets in the end of said projecting portions of said tubes outwardly of said openings.

2. Apparatus according to claim 1 further including a longitudinally disposed trough mounted in said frame below said discharge outlets, and a conveyor in said trough to move the ingredients being discharged from said discharge outlets longitudinally outward of said frame.

3. Apparatus according to claim 2 further characterized in that said conveyor is of the screw or auger type having a centrally disposed shaft which is positioned longitudinally in said trough, and power means mounted in said frame to rotate said last mentioned shaft.

4. Apparatus according to claim 1 further including a pair of juxtaposed and parallel rolls journalled for rotation on a pair of longitudinally extending but transversely spaced axes, said pair of rolls being geared to rotate in opposite directions and said rolls being positioned below certain of said discharge outlets whereby the ingredients being discharged from said certain of said outlets is caused to fall onto the rolls and to be crushed therebetween.

5. Apparatus according to claim 4 further characterized in that said rolls are connected to be driven by the power means for said first mentioned shaft.

6. Apparatus according to claim 5 further characterized in that said power means for said shaft comprises a motor-driven speed reducing unit having an output shaft extending outwardly of either end thereof, and one end of said output shaft being connected to the first mentioned shaft while the other end of said output shaft is connected to said rolls.

7. Apparatus according to claim 1 further characterized in that the means to vary the opening between said first screw conveyors and said other screw conveyors in each of said tubes comprises a disc segment secured to the inner end of the flight of said other conveyor in each tube, said other screw conveyors being mounted on sleeves having greater internal diameter than the external diameter of the shaft and extending outwardly of the closed end of said tube outwardly of the hopper, a tube rotatably mounted on the shaft inwardly of the sleeve, and said last mentioned tube mounting at its inner end a second disc segment and also extending outwardly of said closed end, said disc segments being adjacent and parallel to each other, and means outwardly of said closed end to vary the relative rotational positions of said sleeve and said disc segment mounting tube and to key the same onto the shaft.

References Cited in the file of this patent

UNITED STATES PATENTS

| 301,240 | Ingraham | July 1, 1884 |
| 532,141 | Cornwall | Jan. 8, 1895 |
| 1,462,649 | MacLellan | July 24, 1923 |
| 2,623,658 | Johansen | Dec. 30, 1952 |
| 2,674,396 | Aeterson | Apr. 6, 1954 |
| 2,725,794 | Hayes | Dec. 6, 1955 |
| 2,794,576 | Reynolds | June 4, 1957 |
| 2,864,537 | Throop et al. | Dec. 16, 1958 |
| 2,877,524 | Bishop | Dec. 17, 1959 |
| 2,982,445 | Koble | May 2, 1961 |